(12) United States Patent
Hennecke

(10) Patent No.: US 7,555,533 B2
(45) Date of Patent: Jun. 30, 2009

(54) SYSTEM FOR COMMUNICATING INFORMATION FROM A SERVER VIA A MOBILE COMMUNICATION DEVICE

(75) Inventor: Marcus Hennecke, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/966,781

(22) Filed: Oct. 15, 2004

(65) Prior Publication Data

US 2005/0124322 A1   Jun. 9, 2005

(30) Foreign Application Priority Data

Oct. 15, 2003  (EP)  ................... 03023515
Oct. 15, 2003  (EP)  ................... 03023516

(51) Int. Cl.
 *G06F 15/16* (2006.01)
(52) U.S. Cl. ................... 709/217; 709/219; 709/229; 719/330
(58) Field of Classification Search ................ 719/328, 719/330; 704/231; 709/217, 219, 229
See application file for complete search history.

(56) References Cited

U.S. PATENT DOCUMENTS

| | | | |
|---|---|---|---|
| 4,827,520 A | 5/1989 | Zeinstra | |
| 6,012,030 A | 1/2000 | French-St. George et al. | |
| 6,041,300 A | 3/2000 | Ittycheriah et al. | |
| 6,073,013 A | 6/2000 | Agre et al. | |
| 6,073,101 A | 6/2000 | Maes | |
| 6,088,671 A | 7/2000 | Gould et al. | |
| 6,138,098 A | 10/2000 | Shieber et al. | |
| 6,169,789 B1 | 1/2001 | Rao et al. | |
| 6,173,266 B1 | 1/2001 | Marx et al. | |
| 6,208,932 B1 | 3/2001 | Ohmura et al. | |
| 6,236,968 B1 | 5/2001 | Kanevsky et al. | |
| 6,246,981 B1 | 6/2001 | Papineni et al. | |
| 6,345,254 B1 | 2/2002 | Lewis et al. | |
| 6,393,403 B1* | 5/2002 | Majaniemi | ................... 704/275 |
| 6,396,481 B1* | 5/2002 | Challa et al. | ................... 345/169 |

(Continued)

FOREIGN PATENT DOCUMENTS

EP   0 911 808 A1   4/1999

(Continued)

OTHER PUBLICATIONS

Goose et al., Streaming speech: a framework for generating and streaming 3D text-to-speech and audio presentations to wireless PDAs as specified using extensions to SMIL, International World Wide Web Conference, pp. 37-44, Year of Publication: 2002.*

(Continued)

*Primary Examiner*—Andy Ho
(74) *Attorney, Agent, or Firm*—Brinks Hofer Gilson Lione

(57) ABSTRACT

A system is disclosed for receiving information via a mobile communication device including receiving a dialog script by the mobile communication device for performing a dialog between the mobile communication device and a user. The system runs the dialog script on the mobile communication device to perform a dialog between the mobile communication device and the user. The system also may include a server to provide a dialog script to the mobile communication device, for performing a dialog between the mobile communication device and a user.

19 Claims, 5 Drawing Sheets

U.S. PATENT DOCUMENTS

| | | | |
|---|---|---|---|
| 6,411,934 | B1 | 6/2002 | Moller et al. |
| 6,422,522 | B1 | 7/2002 | Woollen |
| 6,453,020 | B1 | 9/2002 | Hughes et al. |
| 6,496,799 | B1 | 12/2002 | Pickering |
| 6,499,015 | B2 | 12/2002 | Brooks et al. |
| 6,505,155 | B1 | 1/2003 | Vanbuskirk et al. |
| 6,594,630 | B1 | 7/2003 | Zlokarnik et al. |
| 6,598,020 | B1 | 7/2003 | Kleindienst et al. |
| 6,601,029 | B1 | 7/2003 | Pickering |
| 6,654,720 | B1 | 11/2003 | Graham et al. |
| 6,658,388 | B1 | 12/2003 | Kleindienst et al. |
| 6,704,396 | B2 | 3/2004 | Parolkar et al. |
| 6,721,633 | B2 | 4/2004 | Funk et al. |
| 6,741,963 | B1 | 5/2004 | Badt et al. |
| 6,748,361 | B1 | 6/2004 | Comerford et al. |
| 6,763,386 | B2 * | 7/2004 | Davis et al. .................. 709/224 |
| 6,785,651 | B1 | 8/2004 | Wang |
| 6,801,897 | B2 | 10/2004 | Kist et al. |
| 6,832,196 | B2 | 12/2004 | Reich |
| 6,839,670 | B1 | 1/2005 | Stammler et al. |
| 6,895,242 | B2 | 5/2005 | Fu et al. |
| 6,907,119 | B2 | 6/2005 | Case et al. |
| 6,922,200 | B1 * | 7/2005 | Marques ..................... 345/619 |
| 6,925,495 | B2 | 8/2005 | Hegde et al. |
| 6,931,446 | B1 | 8/2005 | Cox et al. |
| 6,950,793 | B2 | 9/2005 | Ross et al. |
| 6,985,850 | B1 | 1/2006 | Scanlan |
| 6,996,426 | B2 * | 2/2006 | Granberg ................. 455/575.4 |
| 7,085,723 | B2 | 8/2006 | Ross et al. |
| 7,099,829 | B2 | 8/2006 | Gomez |
| 7,127,402 | B2 | 10/2006 | Ross et al. |
| 7,146,323 | B2 | 12/2006 | Guenther et al. |
| 7,165,027 | B2 | 1/2007 | Kellner et al. |
| 7,171,365 | B2 | 1/2007 | Cooper et al. |
| 7,174,361 | B1 * | 2/2007 | Paas ........................... 709/203 |
| 7,254,539 | B2 | 8/2007 | Carberry et al. |
| 7,257,537 | B2 | 8/2007 | Ross et al. |
| 2002/0067839 | A1 | 6/2002 | Heinrich |
| 2002/0198699 | A1 | 12/2002 | Greene et al. |
| 2003/0004725 | A1 | 1/2003 | Agapi et al. |
| 2003/0005159 | A1 | 1/2003 | Kumhyr |
| 2003/0040899 | A1 | 2/2003 | Ogilvie |
| 2003/0191646 | A1 | 10/2003 | D'Avello et al. |
| 2003/0236665 | A1 * | 12/2003 | Sharma ...................... 704/260 |
| 2004/0078762 | A1 | 4/2004 | Lee et al. |
| 2004/0167770 | A1 * | 8/2004 | Zhuo et al. ...................... 704/4 |
| 2004/0192384 | A1 | 9/2004 | Anastasakos et al. |
| 2004/0194099 | A1 | 9/2004 | Lamping et al. |
| 2004/0198326 | A1 | 10/2004 | Hirani |
| 2004/0243419 | A1 | 12/2004 | Wang |
| 2004/0249638 | A1 | 12/2004 | Wang |
| 2004/0264672 | A1 | 12/2004 | Paek et al. |
| 2006/0079332 | A1 * | 4/2006 | Bishop ......................... 463/42 |

FOREIGN PATENT DOCUMENTS

| | | | |
|---|---|---|---|
| EP | 1 054 390 | A2 | 5/2000 |
| EP | 1 063 636 | A2 | 12/2000 |
| EP | 1 231 798 | A2 | 8/2002 |
| EP | 03 02 3515 | | 2/2004 |
| FR | 2 808 915 | A1 | 11/2001 |
| GB | 2 343 779 | A | 5/2000 |
| GB | 2 372 864 | A | 9/2002 |
| WO | WO 99/57648 | A1 | 11/1999 |
| WO | WO 00/52921 | A2 | 9/2000 |
| WO | WO 01/41490 | A1 | 6/2001 |
| WO | WO 02/05264 | A1 | 1/2002 |
| WO | WO 02/087098 | A1 | 10/2002 |

OTHER PUBLICATIONS

XP-002271602, Jul. 10, 2000.
XP-002248286, Feb. 20, 2003.
XP-002271304, Jan. 8, 2003.
Kuhn et al., "Learning Speech Semantics with Keyword Classification Trees," CRIM, School of Computer Science, McGill University, Montreal, Quebec, Canada H3A 2A7, Apr. 1993, pp. 1155-1158.
Rudnicky et al., "Spoken Language Recognition in an Office Management Domain," ICASSP 91, vol. 2, 1991 International Conference on Acoustics, Speech, and Signal Processing, May 14-17, 1991, pp. 829-832.
S P A Ringland et al. "Multimodality—the future of the wireless user interface," XP-001171240, BT Technology Journal, vol. 21, No. 3, Jul. 2003, pp. 181-191.

* cited by examiner

| Flights: Munich > Madrid | | | | |
|---|---|---|---|---|
| Preferred Date : Oct 15, 2003 Economy Class Best Buy | | | | |
| Date | Flight | Departure | Arrival | Stops |
| Oct 15, 2003 | LH 4260 | 11:35 | 14:25 | 0 |
| Oct 15, 2003 | LH 5856 | 14:55 | 17:40 | 0 |
| Oct 15, 2003 | LH 4278 | 19:20 | 22:10 | 0 |

Fig.5

SYSTEM FOR COMMUNICATING INFORMATION FROM A SERVER VIA A MOBILE COMMUNICATION DEVICE

PRIORITY CLAIM

This application claims the benefit of European Patent Application No. 03023515.4, filed Oct. 15, 2003, and European Patent Application No. 03023516.2, filed Oct. 15, 2003, which are incorporated herein by reference.

BACKGROUND OF THE INVENTION

1. Technical Field

This application relates to a system for communicating information from a server via a mobile communication device. In particular, this application relates to a system for receiving information by a mobile communication device and for providing information by a server.

2. Related Art

Mobile communication devices such as mobile phones, personal digital assistants (PDA's) with GSM capabilities or automotive head units with a GSM module may be used for acquiring information in different ways. An individual may use one of these devices to request information services, for example, to contact a travel agent to ask for flight information or to call directory assistance. Increasingly, part of or all the requested information services are provided by automated systems. In many cases, a customer places a call to requests a service and at some point in the process is connected to a computer that provides the information.

In the directory assistance example, a customer may use a mobile phone to call the directory assistance number. An individual may initially answer the call to inquire as to the listing requested, however, the requested information is actually provided by a computer. Increasingly, the user is directly connected to a server or a computer that itself is configured to engage in a dialog with the user. During such a dialog, the user is prompted to enter or ask for the information he or she seeks. For example, many airlines have automated systems that permit the user to ask for and receive flight arrival and departure information by responding to a series of questions or prompts by the automated system.

A user may communicate with an automated information service in a number of different ways. Generally, at the beginning of a service request call or inquiry, the information service communicates a predetermined prompt that was stored in the system asking the user what information the user is requesting. The user's response to the prompt may be made in a number of different ways. For example, one or several keys of the mobile communication device may be pressed. Thus, a key or a combination of keys may identify the kind of information requested.

Alternatively, a user's input may be transmitted acoustically. In this case, the user's speech is transmitted to and received by the information server on which speech recognition is performed. After processing the user's recognized speech, the requested information is provided to the user.

In prior systems, the processing of the user's input and the resulting output is performed on the server in accordance with a corresponding dialog script running on the server. This has the drawback that each time a user makes an input or an output comes from the server, the corresponding data must be transmitted from the server to the mobile communication device. Since a large amount of customers may use the same server at the same time, the increased load on the server may result in a delay. Additionally, if speech recognition is performed on the server, a signal with large bandwidth has to be transmitted and the quality of the signal may be considerably reduced when it arrives at the server, thus rendering speech recognition more difficult.

Thus, there is a need for a system for receiving information via a mobile communication device and for providing information by a server that reduces the server load and requires less data transmission bandwidth.

SUMMARY

A system for receiving information via a mobile communication device includes receiving a dialog script by the mobile communication device for performing a dialog between the mobile communication device and a user, and running the dialog script on the mobile communication device to perform a dialog between the mobile communication device and the user. The system also may provide information by a server including providing a dialog script by a server for a mobile communication device, for performing a dialog between the mobile communication device and a user.

Providing information, such as the dialog script, may be performed automatically upon establishment of a data connection. The dialog script may be stored in a memory of the mobile communication device. The dialog script running on the mobile communication device may further acoustically and/or optically prompt the user. The method may include translating an output to the user to a predetermined language. The mobile communication device and/or the server also may be provided with corresponding computer-executable instructions.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 5 illustrates a graphical output of the mobile communication device.

DETAILED DESCRIPTION OF THE PREFERRED EMBODIMENTS

A system is provided for receiving information via a mobile communication device, where a dialog script is sent from a server to the mobile communication device for performing a dialog between the mobile device and the user. The dialog script is run on the mobile communication device to perform a dialog between the mobile communication device and a user.

The system further provides a method for communicating information from a server to a user via a mobile communication device. The method includes establishing a data connection between the mobile communication device and the server, providing information from the server and receiving information via the mobile communication device. The information, such as a dialog script, may be provided automatically upon establishment of the data connection. In this way, a simplified and automated method for communicating information to a user may be provided.

Figure 1:
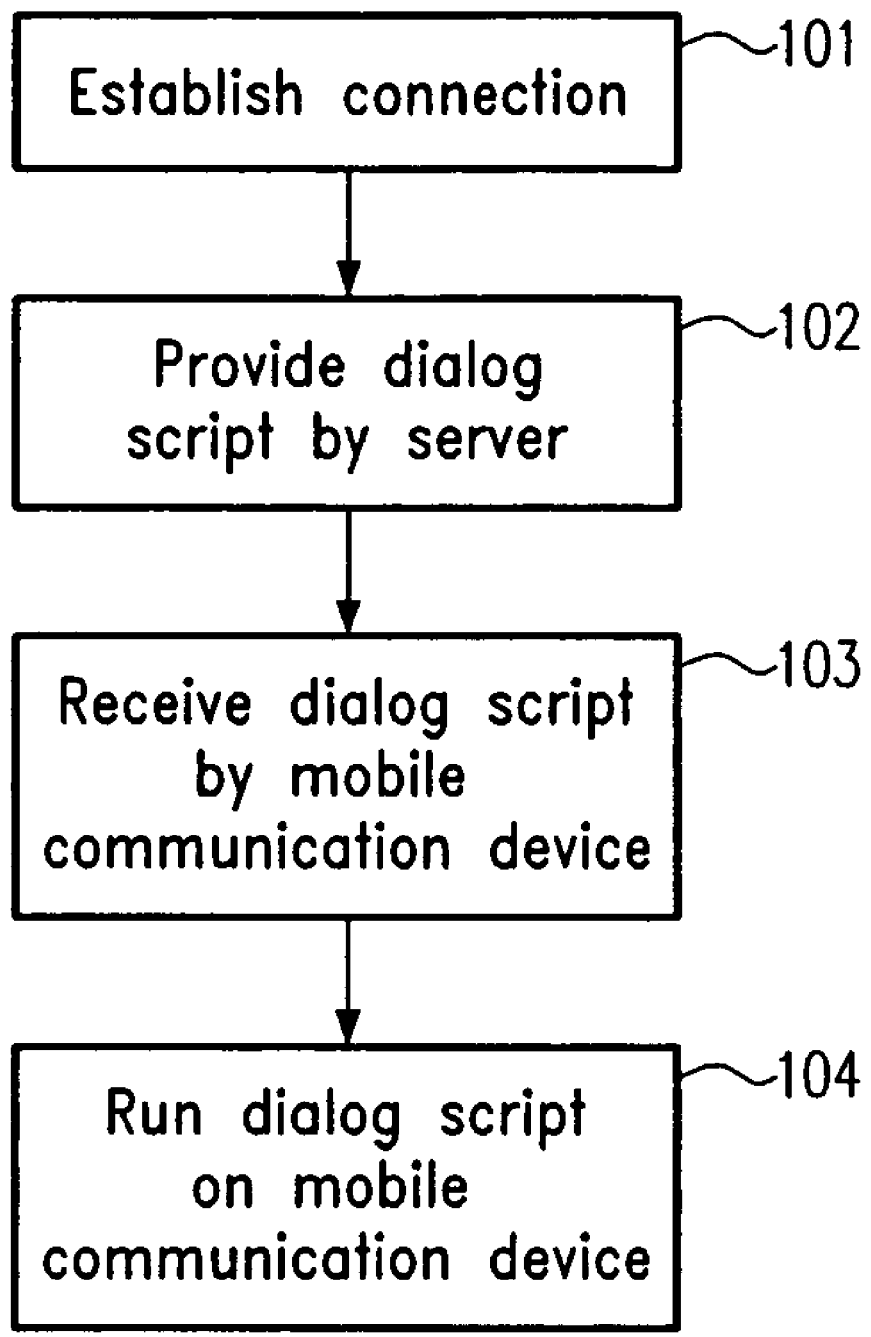
FIG. 1 is a flow diagram illustrating the communication of information from a server via a mobile communication device.

In FIG. 1, a method is illustrated for communicating information from a server to a user via a mobile communication device. Any kind of information, particularly digital information data, may be provided in this way, such as, phone numbers, travel information including flight connections or electronic maps, and the like. Mobile communication devices may include any portable devices that allow for a wireless transmission of signals. Typical mobile communication devices may be mobile phones, PDA's, MDA's (mobile digital assistant), smartphones, or automotive head units. The mobile communication device may include a means for establishing a wireless data connection to a server via a telephone or another network, particularly, a digital network. A connection between a mobile communication device, for example a GSM module and a server, may be established via a corresponding network 101. This may be achieved, for example, by manually dialing a corresponding phone number. The connection also may be initiated automatically upon occurrence of a specific event such as at a specified time. The server may be any device for providing information, for example, a computer of a travel agency, directory assistance service, a service for booking a hotel, or the like. The connection may be established in a wireless manner, for example, by way a common digital mobile phone network, or other network.

After the connection is established, a server may provide information with a dialog script for the mobile communication device 102 to enable the mobile communication network to enter into a dialog with the user. The dialog script may include instructions to the device for causing the mobile communication device to perform a dialog between the device and a user. In particular, the dialog script includes instructions for the mobile communication device regarding how to prompt a user and how to react on a user's input. The mobile communication device may receive the dialog script from the server 103. The dialog script may include instructions that are executable by the mobile communication device. The dialog script may be based, for example, on the XML or voice XML standard. The receipt of the dialog script by the mobile communication device, may also include storing the dialog script in a memory. The dialog script may be loaded either into the internal memory of the mobile communication device or stored in a non-volatile memory of the device. Storing the dialog script in a memory has the advantage that the dialog script may be used each time the mobile communication device communicates with the same server and/or regarding the same subject (requesting telephone number, booking hotel room, requesting flight connection, etc.).

The dialog script may be run on the mobile communication device. In this way, the mobile communication device may enter into a dialog with a user of the mobile communication device without the use of the server. The mobile communication device may prompt the user and then process a subsequent input in order to provide a reaction.

Figure 2:
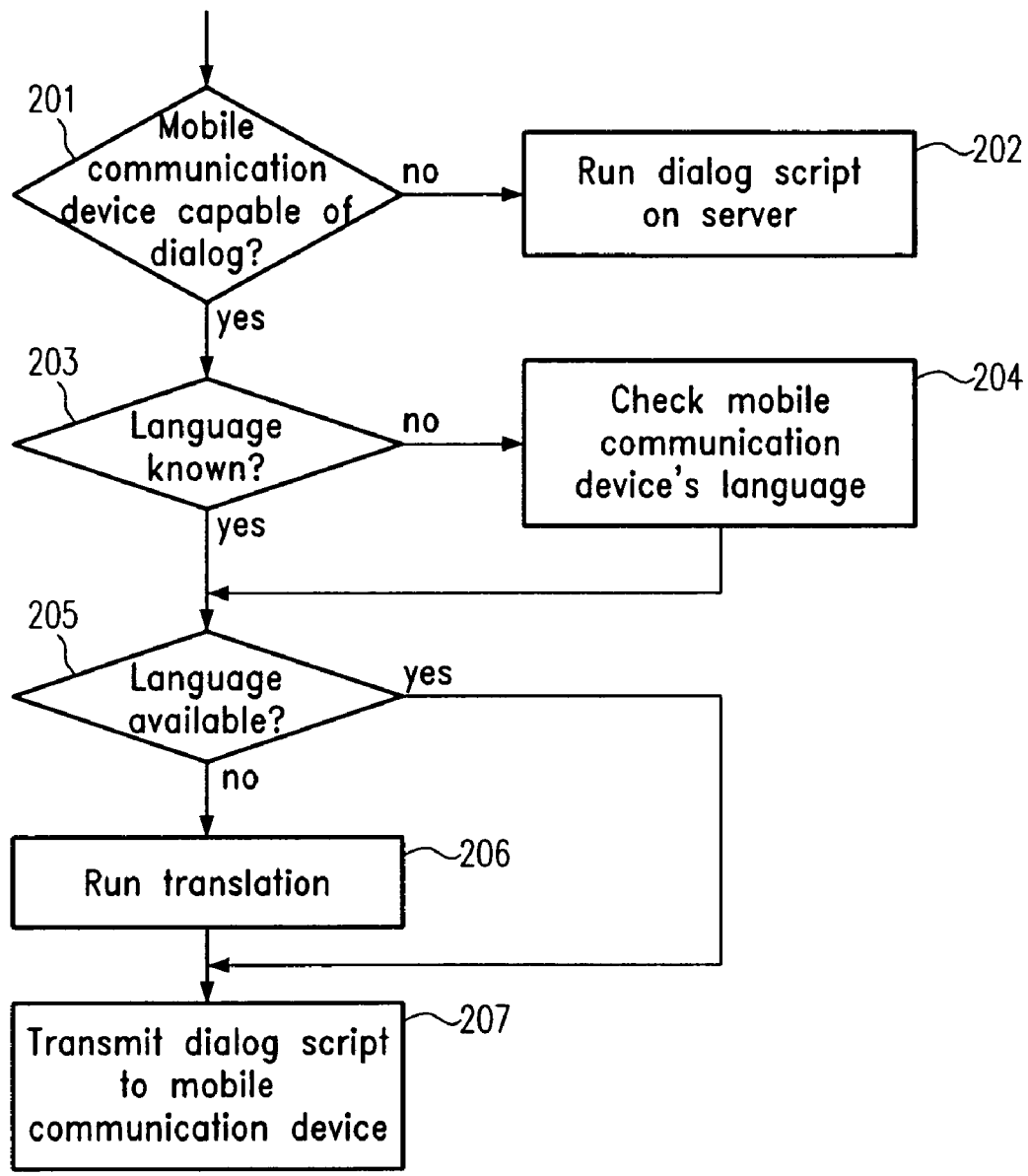
FIG. 2 is a flow diagram illustrating the provision of information by a server.

FIG. 2 illustrates a method of providing the dialog script by a server. A server may include a computer for providing resources, in particular, information data. In the illustrated example, after a connection between the mobile communication device and the server is established, a determination may be made regarding whether the mobile communication device is capable of running a dialog script 201. This may be accomplished several ways. For example, the mobile communication device may, at the beginning of the connection (i.e. upon establishment of the connection), transmit a signal to the server indicating that it would accept or is requesting a dialog script. This may be done with or without specifying the dialog script or some of its parameters (e.g., language) in more detail. Alternatively, upon establishment of the connection, the server may also send a signal to the mobile communication device, for example, for checking whether the mobile communication device may be of a type that—according to the server's knowledge—may be able to run a dialog script. In this case, the server takes the initiative. According to another example, the server also may send a signal to the mobile communication device that prompts the user to indicate whether a dialog script is to be loaded into the mobile communication device. When the user acknowledges to the server that a dialog script is to be used, the dialog may be enabled between the mobile communication device and the user.

Because the dialog script may be run on the mobile communication device, the way the user receives information may be simplified, optimized and improved. Thus, a data connection between the mobile communication device and the server for transmitting the dialog script from the server to the mobile communication device may be required only at the beginning. After that, during the dialog, a connection may be, in principal, only necessary under special circumstances as described here. Thus, a connection time between a server and the mobile communication device may be reduced. Further, since the dialog script may be on the mobile communication device, the load of the server may be relieved. In addition, if, for example, speech input is to be enabled, the speech signal may be processed directly on the mobile communication device with a higher bandwidth and distortions of the signal due to the transmission to the server (for example, via a GSM channel) may be avoided.

The method may include translating an output to the user to a predetermined language. This may be particularly useful if the dialog script may be only available for a language the user may be not familiar with. In such a case, part or all of the output may be translated on the mobile communication device. Hence, even foreign-language people may use the information service and the corresponding dialog script.

If the mobile communication device is not able or refuses to receive a dialog script, a corresponding dialog script may be run on the server instead 202. This means that a dialog only between the server and the user may be performed via the mobile communication device. If, however, transmittal of a dialog script to the mobile communication device is possible, a determination whether a preferred or desired language is known to the server may be made 203. Thus, requesting a dialog script may include requesting a dialog script for a predetermined language. This enables an adaptation of the dialog to a preferred language and results in a multilingual environment. This may be accomplished where the server is capable of selecting between dialog scripts of different languages or translating from one language to another. The server may obtain the corresponding language information in different ways. For example, when establishing the connection with the server, the mobile communication device may provide the server with the information regarding a preferred language.

If the server has no language information, the language of the mobile communication device may be determined 204. This may be achieved, for example, by sending a signal to the mobile communication device asking for any language settings. Thus, the server may retrieve language settings of the mobile communication device or a speech recognition unit that may be present in the mobile communication device. The mobile communication device may have more than one preferred language. For example, multilingual speech recognition or multiple speech recognition capability may be provided. In this case, the information regarding one or several of the preferred languages may be provided for the server. Whether a preferred or desired language is available to the server, may be determined i.e., whether a dialog script for the corresponding language (or one of the preferred languages if more than one is present) is stored in the memory of the server 205. If the preferred language is not available, a translation of some or all parts of the dialog script that will presented (output) to the user may be performed 206, provided that a translation capability is present on the server. As shown in FIG. 2, the dialog script may be transmitted to the mobile communication device where it may be loaded and run 207.

The dialog with the server and a user may be initiated by the mobile communication device requesting a dialog script from a server. This action may result in a distribution or communication of the dialog between the user and the mobile communication device or the server. Thus, a dialog script may be received by the mobile communication device upon request with the server knowing whether to provide a dialog script or not. For example, if a mobile communication device is used that is not configured for receiving information by the methods described here, a server need not provide a dialog script. In this way, the server will not try to provide the mobile communication device with a dialog script that the mobile communication device may be not able to run.

Figure 3:
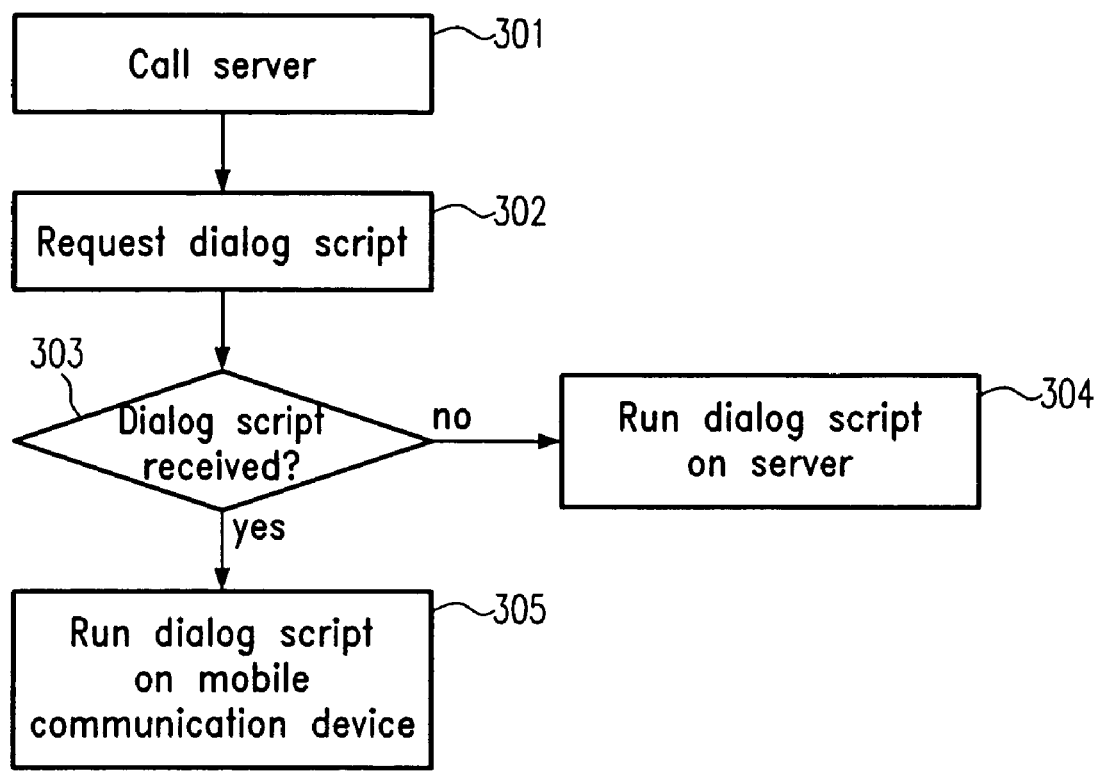
FIG. 3 is a flow diagram illustrating the receipt of information via a mobile communication device.

FIG. 3 illustrates a method for receiving information via a mobile communication device. The mobile communication device calls the server to establish a connection 301. As discussed above, this may be done via a digital telephone network or any other suitable network. After a connection is established, the mobile communication device may request a dialog script 302. This request may be rather unspecific. For example, the mobile communication device may send a signal only identifying the type of the mobile communication device to allow the server to determine whether the mobile communication device is capable of running a dialog script. However, the mobile communication device may provide the server with additional information, such as the desired language or the topic the dialog script should deal with, particularly where the server provides several different services.

Whether the mobile communication device received a dialog script may be determined 303. If it has not, for example, because the server does not offer a desired service or does not provide a dialog script at all, or because a dialog script corresponding to the request (e.g., regarding the language) of the mobile communication device is not available, running a dialog script on the server may be initiated (e.g., by the mobile communication device) 304. In this case, a dialog between a user and the server via the mobile communication device may be initiated, although there may be no dialog between the user and the mobile communication device itself. Alternatively, if a dialog script was received by the mobile communication device, it may be run on the mobile communication device so as to provide a dialog between the user and the mobile communication device 305.

In the examples of FIGS. 1-3, it is assumed that, at least on the server, a dialog script may be run. However, this need not be the case. For example, it may also be possible that a human agent may be contacted via the server. This agent, then, enters into a dialog with the user and may provide the user with the desired information in an electronic way, for example, by sending the information to the mobile communication device via the server.

Figure 4:
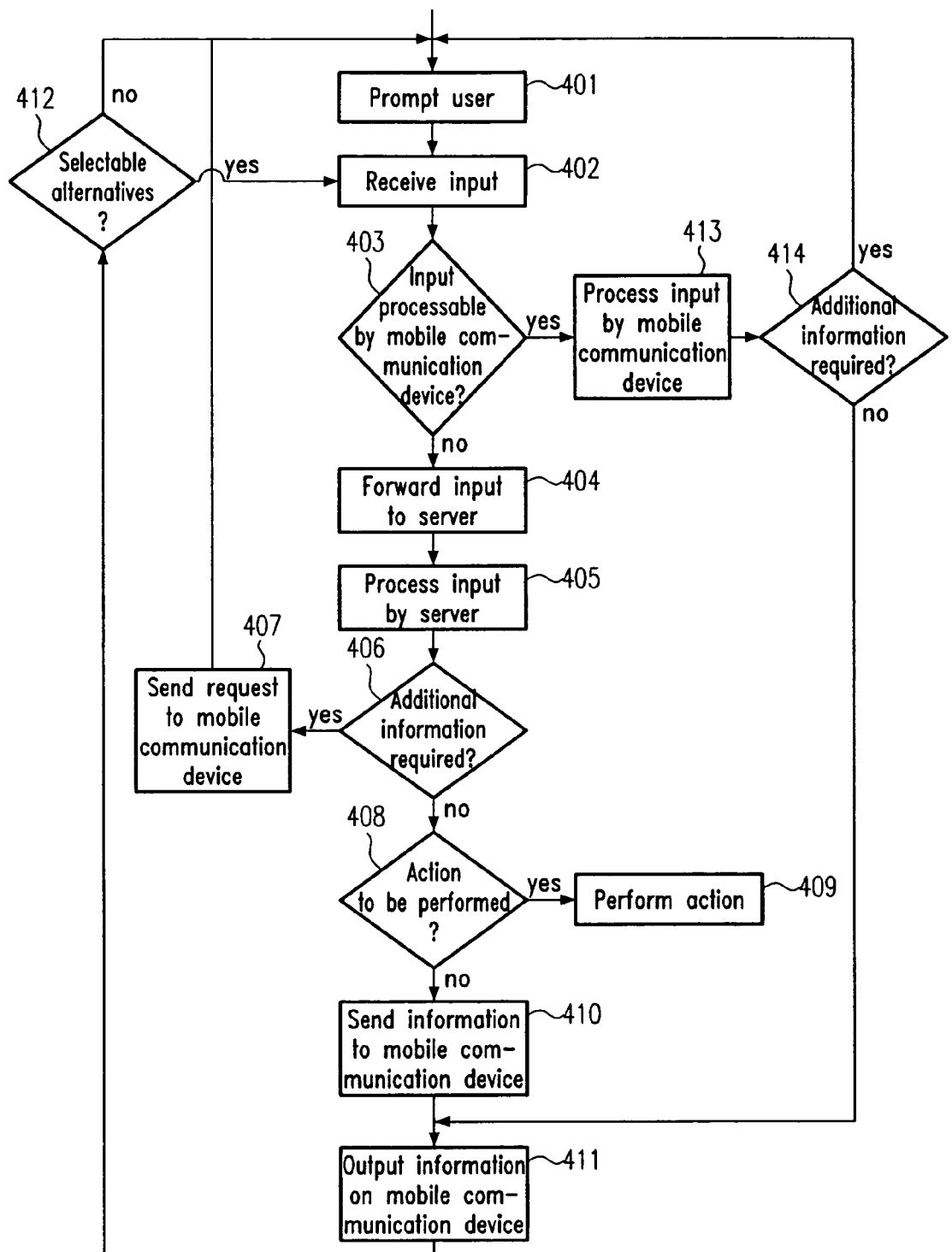
FIG. 4 is a flow diagram illustrating the running of a dialog script.

FIG. 4 illustrates the running of a dialog script. This may include providing a user input, particularly identifying a selected alternative, for a server. Thus, such a user input (e.g., when a user has chosen one out of several alternatives presented to him) may be further processed by the server, for example, resulting in an action initiated by the server. During a corresponding dialog, a user may be prompted one or more times 401. For example, after establishment of a data connection between the mobile communication device and a server of a travel agency or an airline, a typical dialog may start with: "Welcome to our automated flight information service. Please state the name of the departure city." Such a prompt may be output in a variety ways. For example, an acoustical output may be affected either by playing a previously stored speech signal or by synthesizing a corresponding speech signal. In addition or alternatively, an optical output on a display of the mobile communication device may be provided. In particular, presenting a prompt on a display simplifies the user's interaction with the prompt, especially if the prompt has a complicated form, since the user need not memorize every detail of the prompt.

The acoustical and the optical output may, but need not be, identical. For example, in the case of the above-mentioned flight information, the term "Departure city?" may appear on the display at the beginning of the dialog. An input of a user may be received 402. Again, this input may be accomplished in a variety of ways. A user may input the required information acoustically, for example, by speaking the word "Munich." A haptic input also may be used. A haptic input includes both an input via keys or via selecting on a touch screen. For example, a user may enter the input via one or several keys that may be part of the mobile communication device. If the mobile communication device includes a touch screen, different alternatives to be selected by the user may be displayed on a touch screen such that the user may select an alternative directly via the touch screen, for example, by selecting the city name out of a presented list of possible inputs. With a touch screen, a graphical input may be used. A graphical input may be a touch screen input wherein the user provides the input in a graphical way, for example, by writing the input on the touch screen by hand using a corresponding pen.

Whether the mobile communication device can process the input may be determined 403. Processing the input may be done in a number of ways. In some cases, the input must first be processed to be recognized. For example, an acoustic input may include processing the acoustic input using speaker independent and/or speaker dependent speech recognition. For this, standard methods of speech recognition may be used. As the dialog script and, thus, the processing of the acoustic input may be run on the mobile communication device, speaker dependent speech recognition may be particularly useful since the corresponding speech recognition unit or module of the mobile communication device may be trained once and may be then adapted to the user. In any case, using the speech recognition of the mobile communication device improves the quality of the recognition since the speech signal may be processed directly without any transmission to a server. Alternatively and/or additionally, speaker independent speech recognition may be performed on the server or on the mobile communication device. For example, when an acoustic input is enabled for a dialogue mode in a complex case, the speech recognition may be performed by the server. In another example, receiving the dialog script from the server may include receiving a dialog specific speech recognition vocabulary set from the server. This improves the speech recognition for a specific dialog script, particularly if more complex and less common words are to be recognized. If an input is graphically performed via a touch screen, character or handwriting recognition may be performed to recognize this input. This further simplifies the dialog for the user. When using character recognition or handwriting recognition, a user may enter an input by writing it onto the screen.

The mobile communication device may be unable to perform speech recognition or recognize a specific input utterance because no corresponding vocabulary may be stored in the mobile communication device. For example, if a city name is to be recognized, the corresponding list of possible city names might be too large to be stored in or transmitted to the mobile communication device and, thus, only present on the server. This may also be the case with haptic or graphical input via a touch screen. In this case, the input may be processed by the server 405, for example, using an appropriate speech or character recognition. This forwarding of the input to the server may be particularly useful if processing the input requires a large amount of data.

After processing the input, whether additional information (additional input) may be required for continuation may be determined 406. If this is the case, a corresponding signal or request may be sent to the mobile communication device 407. This may result in another prompt regarding this additional information 401. In the above example, such a prompt may include, "Please state the name of the destination city" (acoustical output) and "Destination city" (optical output on display). The user may enter a corresponding input, "Madrid," for example, and the dialog continues as described above. If no further information is required, whether the input requires performance of an action may be determined 408. An action may include the booking of a flight or of a hotel room. If the answer is yes, the corresponding action may be performed 409.

In the example corresponding to the illustrated dialog, an alternative to performing an action may be providing information for an action that is not preformed. Thus, if no action is to be performed, the required information may be sent to a mobile communication device 410. The mobile communication device may output the information 411 to the user. Providing the information need not be an alternative to performing an action but may be carried out in addition or in parallel to the action. As described above, an output may be an acoustical and/or an optical output. The method may have the server receive electronic data from the mobile communication device that identifies a selected alternative. In particular, the information may be output on a touch screen such that different alternatives may be presented to the user who may choose one of these alternatives via the touch screen. The server will process the user's input depending upon which alternative the user selected from the number of alternatives that were presented.

An optical output suitable for a touch screen is illustrated in FIG. 5. Before the output is displayed on the screen, necessary information was acquired in the preceding steps of the dialog script namely, the departure city, the destination city and the date. The user may be provided with a plurality of possible alternatives, such as a set of possible flight connections from Munich to Madrid. The user also may be enabled to select one of the flights. Whether particular flight connections are available for selection may be indicated by emphasized, for example, underlined flight numbers. The user may select one of the flights by touching the screen at the appropriate position. If number keys, such as the digits on a mobile phone, are available, the user also may press one of the keys corresponding to a particular choice. In another example, the user may speak the connection by saying the flight number or the time (e.g., "Flight 4260" or "The connection departing at 14:55, please").

As shown in FIG. 4, if the output includes selectable alternatives 412, the dialog may await a further input 402, i.e., the selection of an alternative. If no selectable alternatives are present, the user may be prompted again 401. If the input can be processed by mobile communication device, the input may be processed by the mobile communication device itself 413. Whether additional information is required may then be determined 414. In order to perform the steps of the methods illustrated by the Figures, the mobile communication device and/or the server may be provided with corresponding computer-executable instructions. The executable instructions may include initiating an action by the server corresponding to the selected alternative. An action may be a step that is outside of the dialog that provided the alternatives that were selected. For example, selecting the flight was a dialog that contained alternatives. Actually booking the flight may be the action. Therefore, the dialog script provided for a dialog between the mobile communication device and the user and the user may achieve the desired result.

The methods illustrated may include initiating a dialog between a user and a server. In this way, during the dialog between the mobile communication device and the user, a dialog between the user and a server may be also performed upon initiation of the mobile communication device or the dialog script running on the mobile communication device. Thus, the dialog may be distributed between the user on the one side and the mobile communication device and the server on the other side. This may be particularly useful if at a stage during the dialog between the mobile communication device and the user in which the capabilities of the mobile communication device are not sufficient. Then, the server may take over for this part of the dialog.

The mobile communication device may need additional data to continue the dialog. For example, if the user requests timetable information, the memory of the mobile communication device may be too small to store all possible destinations or the required time for transmitting all the destinations to the mobile communication device. A dialog between the user and the server may be useful such that, for example, a speech input from the user may be processed by the server that then, transmits the resulting data (e.g., a specific destination) to the mobile communication device for continuation of the dialog between the mobile communication device and the user. In this way, one has both a dialog between the user and the mobile communication device and—via the mobile communication device—a dialog between the user and the server.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for establishing a dialog between a mobile communication device and a user, comprising:
   requesting a dialog script from a remote server connected with the mobile communication device, where the dialog script is configured to perform a dialog between the mobile communication device and a user,
   executing the dialog script on the remote server when the mobile communication device does not receive the dialog script or is incapable of executing the dialog script;
   storing the dialog script on the mobile communication device when the mobile communication device receives the dialog script from the remote server; and
   executing the dialog script on the mobile communication device when the mobile communication device receives the dialog script from the remote server, where the dialog script sustains the dialog between the mobile communication device and the user after the connection between the remote server and the mobile communication device is closed;
   where the dialog comprises an acoustic and optical presentation of selectable alternatives to the user and a response from the user selecting at least one of the selectable alternatives.

2. The method of claim 1 where the receiving of the dialog script from the server comprises storing the dialog script in a memory of the mobile communication device.

3. The method of claim 1 where the running of the dialog script on the mobile communication device comprises at least one of acoustically and optically prompting the user.

4. The method of claim 1 further comprising providing an output on the mobile communication device based on the dialog between the mobile communication device and the user, where the output conveys at least a portion of the information from the dialog.

5. The method of claim 1 where the running of the dialog script on the mobile communication device comprises at least one of acoustically and optically presenting information to the user.

6. The method of claim 5 where information from the dialog includes alternatives from which a user may select.

7. The method of claim 5 where the optical presentation comprises presenting at least a part of the information as selectable via a touch screen.

8. The method of claim 1 further comprising providing a user input, where the user input allows the user to provide information through the dialog with the mobile communication device.

9. The method of claim 8 where providing the user input comprises identifying a selected alternative.

10. The method of claim 1 where the running of the dialog script on the mobile communication device comprises acquiring an input selected from the group consisting of an acoustic input, a haptic input, and a graphical touch screen input.

11. The method of claim 10 comprising processing the acoustic input using at least one of speaker independent and speaker dependent speech recognition.

12. The method of claim 11 where the receiving of the dialog script from the remote server comprises receiving a dialog specific speech recognition vocabulary set from the remote server.

13. The method of claim 10 where acquiring the graphical input comprises processing the input using character recognition.

14. The method of claim 1 where the receiving of the dialog script from the remote server comprises requesting a dialog script for a predetermined language.

15. The method of claim 1, where the persistent memory comprises a non-volatile memory.

16. The method of claim 1 where the executing the dialog script on the mobile communication device comprises closing the connection between the remote server and the mobile communication device.

17. A method for communicating information from a server via a mobile communication device, comprising:
   establishing a data connection between the mobile communication device and the server,
   providing a dialog script to a mobile communication device from a server and storing the dialog script on the mobile communication device, where the dialog script is configured to sustain a speech dialog between the mobile communication device and a user, and
   receiving information on the mobile communication device based on the speech dialog between the mobile communication device and a user, where the speech dialog between the mobile communication device and the user occurs while the data connection between the mobile communication device and the server is closed;
   where the receiving information further comprises:
      receiving an acoustic and optical presentation of selectable alternatives to the user; and
      providing a response to the server that selects one of the selectable alternatives.

18. The method of claim 17, where the information may be received automatically upon establishment of the data connection.

19. A computer program product comprising:
   a computer useable medium having computer readable code embodied in the medium, the computer readable code comprising:
   computer readable code executable to receive a dialog script at a mobile communication device from a connection with a remote server;
   computer readable code executable to store the dialog script in memory on the mobile communication device, where the dialog script is configured to sustain a dialog between the mobile communication device and a user, the dialog comprising an acoustic and an optical presentation of selectable alternatives to the user and a response from the user selecting at least one of the selectable alternatives;
   computer readable code executable to output the acoustic presentation based on the dialog on the mobile communication device; and
   computer readable code executable to display the optical presentation based on the dialog on the mobile communication device.

* * * * *